H. S. HOLMES.
MACHINE FOR CUTTING OFF FINS FROM ELECTRICALLY WELDED WORK.
APPLICATION FILED AUG. 4, 1920.

1,382,193.

Patented June 21, 1921.

Inventor
Henry S. Holmes
By his Attorney
Paul Benjamin

UNITED STATES PATENT OFFICE.

HENRY S. HOLMES, OF BROOKLYN, NEW YORK.

MACHINE FOR CUTTING OFF FINS FROM ELECTRICALLY-WELDED WORK.

1,382,193. Specification of Letters Patent. Patented June 21, 1921.

Application filed August 4, 1920. Serial No. 401,165.

*To all whom it may concern:*

Be it known that I, HENRY S. HOLMES, a citizen of the United States, residing at Brooklyn, in the county of Kings and State of New York, have invented a certain new and useful Improvement in Machines for Cutting Off Fins from Electrically-Welded Work, of which the following is a specification.

The invention is a machine for removing the fins formed on opposite sides of an electrically welded object, by reason of metal extruded from the joints.

In the accompanying drawing—

Figure 1:
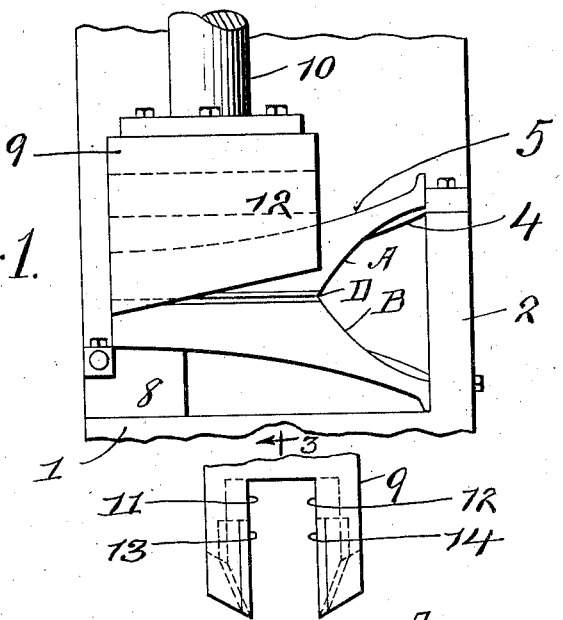
Figure 2:
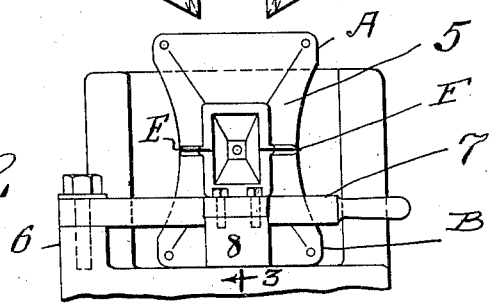
Figure 3:
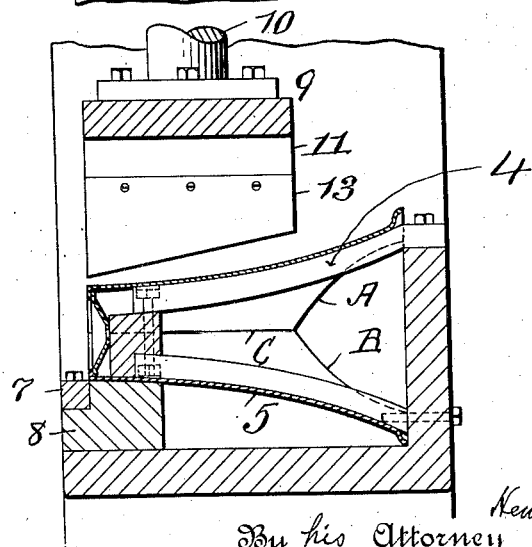

Figure 1 is a side elevation of my fin-removing machine. Fig. 2 is a front elevation. Fig. 3 is a section on the line 3, 3 of Fig. 2.

Similar numbers and letters of reference indicate like parts.

The machine is here shown adapted to cutting off the fin or metal extruded at the joints resulting from electrically welding together the two parts A, B of a cream separator pedestal. Said parts are stamped from sheet steel. They are placed in the welding machine with their straight edges in contact, and electrically welded together. The joints are shown at C and D, and the fins on the exterior thereof at E and F.

1 is the bed of the machine and 2 a vertical plate thereon. To said plate is bolted or otherwise secured a horizontal mandrel 4 which conforms in shape to the interior of the pedestal 5 so that said pedestal fits thereon, the fins E, F then protruding, as shown, on opposite sides of said pedestal.

Pivoted on a lug 6 on the bed 1 is a horizontally swinging bar 7 which is received in a shouldered block 8 and bolted to said block. By means of the bar 7 the block 8 may be brought under the outer end portion of the pedestal 5 when in place on mandrel 4 to serve as a support for said mandrel during the cutting operation. In placing the pedestal upon the mandrel and in removing said pedestal therefrom, the block 8 is moved out of the way by means of the swinging bar 7.

9 is the cutter head which is secured to a vertically moving rod or plunger 10 operated by any suitable means. Said head has two parallel arms 11, 12, on the inner sides of which are bolted the upwardly and rearwardly inclined blades 13, 14 which, when the head is caused to descend, receive between them the pedestal 5 and act with a shearing cut upon the fins E and F to remove said fins.

I claim:

1. A shearing machine for removing fins from opposite sides of an electrically welded object, comprising a vertical support, a horizontal mandrel secured thereto at one end and adapted to enter and carry said object, a vertically movable head above said mandrel, and, on said head, two vertical shearing blades respectively disposed to receive between them said object and on descending to cut off said fins therefrom.

2. A shearing machine, as in claim 1, further comprising a horizontal bed carrying said support, a horizontally swinging arm pivoted on said bed, and a block on said arm; the said arm being movable to carry said block into and out of position to support the outer end of said mandrel.

In testimony whereof I have affixed my signature in presence of two witnesses.

HENRY S. HOLMES.

Witnesses:
 GERTRUDE T. PORTER,
 MAY T. MCGARRY.